Dec. 4, 1962

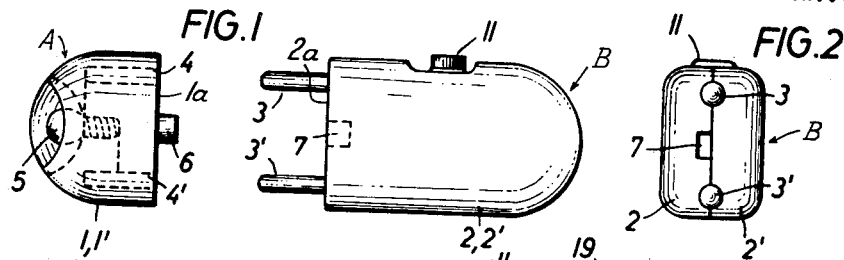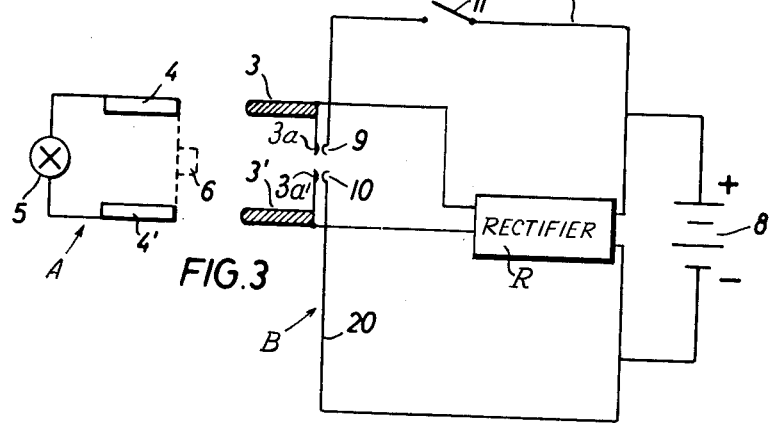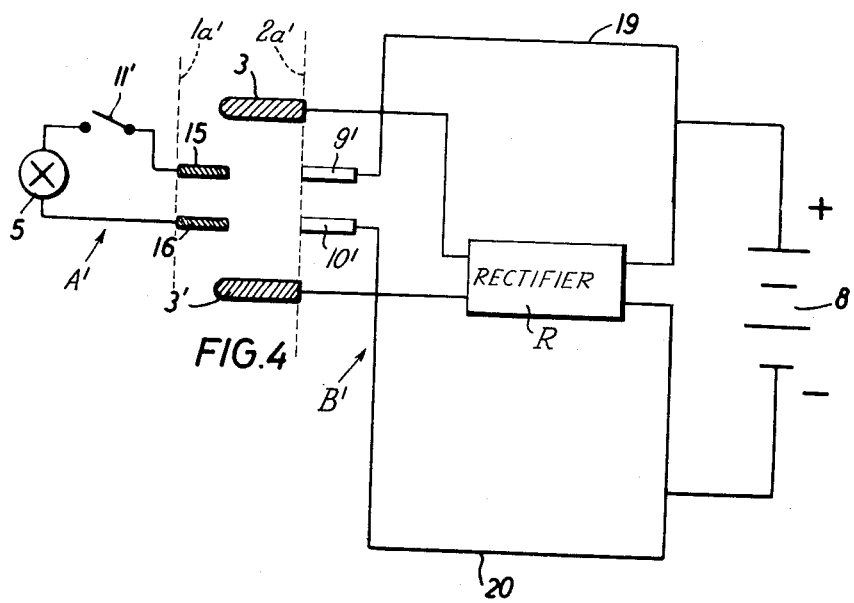

R. HOPT ET AL 3,067,373

POWER-UNIT LOAD UNIT ASSEMBLY

Original Filed April 22, 1957

RUDOLF HOPT
LUDWIG FALK  ALFONS HÄRING

INVENTORS

BY
ATTORNEY

3,067,373
POWER-UNIT LOAD UNIT ASSEMBLY
Rudolf Hopt, Ludwig Falk and Alfons Haring, Schorzingen, Germany, assignors to Karl Hopt G.m.b.H., Schorzingen uber Rottweil, Germany
Original application Apr. 22, 1957, Ser. No. 654,273. Divided and this application Dec. 2, 1959, Ser. No. 856,874
Claims priority, application Germany, Aug. 25, 1956
17 Claims. (Cl. 320—2)

This application is a division of our copending application Serial Number 654,273, filed April 22, 1957.

The present invention relates to a power unit-load unit assembly.

More particularly, the present invention relates to a portable power unit-load unit assembly in which the power unit contains a battery capable of being charged.

It is an object of the present invention to provide a readily portable assembly which consists of a power unit and of a load unit, which units may be electrically and mechanically connected to each other so as to form a compact assembly that can easily be carried in one hand.

It is another object of the present invention to provide a combined power unit-load unit assembly, the power unit of which can easily be disconnected from the load unit and be connected to any readily available source of alternating current, such as by being plugged into a conventional household wall outlet.

It is still a further object of the present invention to provide a power unit which can easily be connected to any one of a number of different load units.

The objects of the present invention further include the provision of a portable combined power unit-load unit assembly which is absolutely foolproof in that even a child can connect the individual units to each other and, if necessary, disconnect the units from each other and plug the power unit into a wall outlet until the battery contained in the power unit is sufficiently charged.

It is yet another object of the present invention to provide a portable combined power unit-load unit assembly which can easily be mass-produced at low cost.

It is also an object of the present invention to provide a power unit-load unit assembly which is very rugged, which can withstand rough usage, and which will give extremely long periods of trouble-free service.

The objects of the present invention furthermore include the provision of a portable combined power unit-load unit assembly, the power unit of which has prongs which enable the power unit to be plugged into a wall outlet or the like, but which are completely hidden from view when the power unit is connected to the load unit.

The objects of the present invention additionally include the provision of a portable combined power unit-load unit assembly of the above described type in which the prongs of the power unit may be hidden from view even when the power unit is separated from a load unit.

With the above objects in view, the present invention mainly consists in a portable combined power unit-load unit assembly which comprises a load unit and a power unit adapted to be mechanically and electrically connected to the load unit. The power unit includes a storage battery and prong means electrically connected thereto for connecting the power unit to a source of electric energy in such a manner that the storage battery may be charged thereby. The prong means are so constructed and arranged that at least when the units are mechanically and electrically connected to each other, the prong means occupy a position wherein they are entirely within at least one of the units.

The novel features which are considered as characteristic for the invention are set forth in particular in the appended claims. The invention itself, however, both as to its construction and its method of operation, together with additional objects and advantages thereof, will be most understood from the following description of specific embodiments when read in connection with the accompanying drawings, in which:

FIGURE 1 is a diagrammatic view of a power unit-load unit assembly according to the present invention, the two units being shown separated;

FIGURE 2 is an end view of the power unit shown in FIGURE 1;

FIGURE 3 is a schematic circuit diagram of one embodiment of a power unit-load unit assembly according to the present invention;

FIGURE 4 is a schematic circuit diagram of another embodiment of a power unit-load unit assembly according to the present invention;

Figures 5, 6:
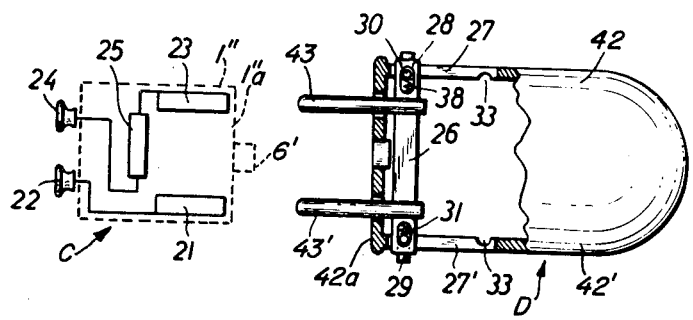
FIGURE 5 is a schematic diagram of a connector adapted to be used in conjunction with a power unit incorporated in the power unit-load unit assembly shown in FIGURES 1–3.
FIGURE 6 is a view, partly in section, of one embodiment of a power unit having retractable prongs.

Referring now to the drawings, and to FIGURES 1–3 thereof in particular, there is shown a power unit-load unit assembly consisting of a load unit A and a power unit B. The former is shown in the form of a light and is composed of a pair of opposite shells 1, 1' which may be made of any suitable material, such as plastic, the shells being connected to each other in any suitable manner, such as by screws, or by means of an adhesive. The load unit A contains a load component such as a lamp socket adapted to receive bulb 5, a suitable reflector being provided for focusing the light emitted by the bulb. The surface portion of the load unit which forms its end face is indicated at 1a, and a pair of sockets 4, 4' which are electrically connected to the bulb 5 open at this surface portion. Additionally, the load unit is formed with a boss portion 6 which projects from the surface portion 1a, the purpose of which will be described below.

The power unit B is likewise composed of a pair of opposite shells 2, 2' which are also preferably made of plastic and which are connected to each other in any suitable manner. The surface portion of the power unit B which forms its end face is indicated at 2a, and a pair of prongs 3, 3' project from this surface portion. The cross-section of the prongs corresponds to that of the sockets 4, 4', and the arrangement of the parts is such that when the units A and B are placed next to each other with their surface portions 1a, 2a superposed upon each other, the prongs 3, 3' are received within the sockets 4, 4', respectively. Preferably, the prongs are firmly held by the sockets, so that the prongs serve as a mechanical connection between the units A and B.

The power unit B contains a storage battery 8, i.e., a battery capable of being charged. Such a battery may be composed of small acid-proof hermetically sealed nickelcadmium cells. Suitable rectifier means R are electrically connected to the battery and to the prongs 3, 3' so that the entire power unit may be connected directly to a source of alternating current. This source may be in the form of an ordinary household wall outlet connected to a voltage source within the range of 105 to 230 v. and at a frequency of between 25 to 60 c.p.s. Thus, while the drawing illustrates the prongs 3, 3' as having a substantially circular cross-section, it will be understood that they may have a substantially rectangular cross-section similar to that of an ordinary male plug.

The rectifier R may be of the Wheatstone bridge type shown in the above-identified parent application, or in Woodbridge, 1,967,801, or Fry, 2,876,410, employing selenium or copper oxide cells connected in series opposition, each in a respective arm of the bridge, in a manner well known in the art.

In practice, the rectifiers are so selected that the power unit B can be plugged into and the battery be charged by a voltage source which delivers anywhere between 105 and 230 v.

Additional circuit means are provided for electrically connecting the prongs 3, 3' directly across the battery 8. The circuit means include leads 19 and 20, the ends 9, 10 of which constitute stationary contacts adapted to cooperate, respectively, with the movable contacts 3a, 3a' connected to the prongs 3, 3'. The contacts 9, 10 and 3a, 3a' constitute a normally open switch and according to the present invention, this switch is located in the region of the surface portion 2a. Preferably, the switch is located in a recess which opens in this surface portion 2a, and the recess is adapted to receive the above described boss portion 6 which projects from the surface portion 1a of the load unit A. The arrangement of the parts is such that when the two units are connected to each other, the boss portion 6 will act as a switch actuator and press the contacts 3a, 3a' into engagement with the contacts 9, 10, thereby placing the bulb 5 directly across the battery 8. An additional manually operable switch 11 may be provided in the circuit incorporating the battery 8 and the bulb 5 for opening and closing this circuit whenever desired.

It will be seen from the above that the prongs 3, 3' accomplish a triple function, in that they serve as a mechanical connector between the load unit A and the power unit B, as well as an electrical connector between these units. Additionally, the prongs act as an electrical connector between the power unit B and a source of electric energy for charging the battery 8.

As may best be seen in FIGURE 2, the recess 7 is located eccentrically or non-symmetrically relative to the power unit B. The boss 6 on the load unit A must therefore be positioned in a corresponding position, and the boss portion 6 and recess 7 may therefore serve as an indexing device which prevents the two units from being connected to each other in any but one desired manner, so that the units may be connected to each other wtih due regard to the polarity of the battery 8. Such an arrangement is desirable in cases where the load unit incorporates transistor or other electrical components which must be connected to a direct current source in a certain manner.

The arrangement shown in FIGURE 4 differs from the above described embodiment in that the prongs 3, 3' are not relied upon to establish an electrical connection between the battery 8 and the load component of the load unit A'. Instead, the ends of the leads 19 ad 20 are connected to socket means such as leaf springs or sockets 9' and 10' which open at the end face of power unit B', the end face being shown schematically at 2a', and the load component of the load unit A' is connected to two prongs 15, 16 which project through the end face 1a' of the load unit and which are adapted to be received in the sockets 9', 10'. Thus, when the surface portions 1a', 2a' are superposed upon each other, the two units are mechanically connected to each other by the prongs 3, 3' and electrically connected to each other by the prongs 15, 16 and the sockets 9', 10'.

Additionally, the arrangement shown in FIGURE 4 differs from the embodiment shown in FIGURES 1–3 in that a switch 11' for opening and closing the circuit incorporating the load component of the load unit A' and the battery 8 of the power unit B' is located in the load unit.

FIGURE 5 shows a connector C which is adapted to be used with the above described power unit B for enabling the storage battery 8 thereof to be connected to a source of direct curent in such a manner as to be charged thereby. The connector comprises a connector body shown schematically at 1" which is formed with an end face or surface portion 1a" that corresponds to the surface portion 2a of the power unit B, a pair of input terminals 22, 24, and a pair of sockets 21, 23 which open at the surface portion 1a" and which are adapted to receive the prongs 3, 3'. The input terminals 22, 24 are connected to the sockets 21, 23, respectively, a current limiting resistor 25 being provided in the lead connecting the terminal 24 and the socket 23.

Additionally, the connector C is formed with a boss portion 6' which serves the same function as the above described boss portion 6 of the load unit A. Thus, when the prongs of the power unit B are inserted into the sockets of the connector C, the switch incorporating the contacts 3a, 3a' and 9, 10 is closed thereby connecting the battery 8 directly across the input terminals 22, 24 of the connector C. In this way, the prongs 3, 3' serve to connect the power unit B and the connector C both mechanically and electrically to each other, so that the battery 8 may be charged by a direct current source connected to the input terminals of the connector.

Figure 8:
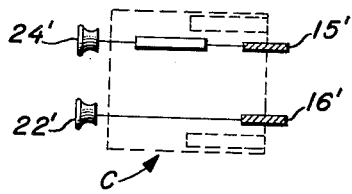
FIGURE 8 is a schematic diagram of a connector adapted to be used in conjunction with a power unit incorporated in the power unit-load assembly shown in FIGURE 4.

A similar connector C', shown in FIGURE 8, may be provided for enabling the power unit B' (FIGURE 4) to be connected to a direct current source. This connector is similar to the above described connector C, except that it includes additional prongs 15' and 16' which are electrically connected to the input terminals 22' and 24'. The prongs project through the end face of the connector and are adapted to be received in the sockets 9', 10' of the power unit B'. In such an arrangement the prongs 3, 3' of the power unit serve to connect the power unit and connector to each other mechanically only, the electrical connection being provided by the additional prongs 15' and 16' of the connector.

Figure 7:
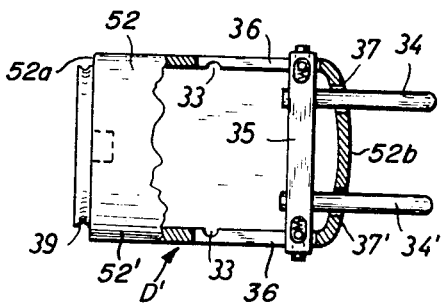
FIGURE 7 is a view, partly in section, of another embodiment of a power unit having retractable prongs.

FIGURES 6 and 7 show power units D and D', respectively, in which the prongs are mounted for movement between a projecting position wherein they project exteriorly of the power unit and a retracted position wherein they are entirely within the unit. As a result, when the prongs are in their projecting position the power unit may be connected to a source of electric energy in such a manner that the storage battery is charged thereby, and when the prongs are in their retracted position the power unit, taken by itself, forms an individual unit the prongs of which are entirely within the unit.

In the embodiment shown in FIGURE 6, the prongs 43 and 43' are caried by a bridge 26 made of insulating material, the ends of which are slidably arranged in slots 27, 27' formed in the shells 42, 42' of the power unit D. The bridge 26 is formed in its ends with longitudinal bores 28 in each of which a pressure pin 29 is slidably arranged. Each pressure pin carries a cross piece 30 which is arranged transversely to the respective pin and projects through a pair of diametrically opposite elongated slots 31 that communicate with the respective bore 28. Each cross piece 30 extends beyond the bridge 26 and is adapted to be received in recesses 33 formed in the shells 42, 42'. These recesses are arranged at those points along the slots 27, 27' which correspond to the projecting and retracted positions of the prongs, and each cross piece is outwardly biased by a spring 38 so as to act as a detent for maintaining the bridge 26 carrying the prongs 43, 43' in either projecting or retracted position. Thus, the bridge may be moved from one position to another by first pressing the two pressure pins 29 inwardly and then shifting the bridge 26 to the other position.

Suitable circuit means (not shown) are provided for electrically connecting the prongs 43, 43' to the rectifier means at least at such time when the prongs are in their projecting position. These circuit means may be in the form of electric contacts which are carried by the prongs and which engage stationary terminals of the rectifier circuit when the bridge 26 occupies the position shown in FIGURE 6.

In the embodiment shown in FIGURE 6 the bridge 26 is so positioned that when the prongs are in their projecting position they project through the end face 42a of the power unit D, which end face is that surface portion of the power unit which is superposed upon the corresponding surface portion of the load unit when the power and load units are connected to each other. Thus, the prongs 43, 43' may, as in the above described embodiments, be used to connect the power and load units to each other, either both mechanically and electrically or simply mechanically, although other connecting means, such as a bayonet coupling or other retaining means may be used for mechanically connecting the power and load units to each other.

The power unit D' shown in FIGURE 7 differs from the power unit D of FIGURE 6 in that the prongs 34, 34' in their projecting position project through end face 52b of the power unit which is opposite the end face 52a, the latter being the end face which is superposed upon the corresponding end face of a load unit. Thus, the bridge 35 carrying the prongs 34, 34' is arranged in slots 36 which are formed in the opposite end of the shells 52, 52', and the prongs 34, 34' in their projecting position extend through openings 37, 37' formed in the end face 52b. Thus, when the prongs are in their projecting position, the power unit D' may be plugged into a wall outlet so that the battery contained in the power unit (not shown in FIGURE 7) may be charged.

The power unit D' is formed with a bayonet coupling so as to be adapted to be connected to a correspondingly constructed load unit. Preferably, such load unit is formed with prongs corresponding to the prongs 15, 16 of FIGURE 4, and the power unit D' includes sockets adapted to cooperate with these prongs, so that the load unit may be connected directly across the storage battery.

It will be seen from the above that in power unit-load unit assemblies constructed in accordance with any of the above embodiments, the prongs of the power unit will, at least when the unit is connected to a load unit, be completely covered and be hidden from view.

It will be understood that each of the elements described above, or two or more together, may also find a useful application in other types of power unit-load unit assemblies differing from the types described above.

While the invention has been illustrated and described as embodied in a portable power unit-load unit assembly which can easily be held in one hand and in which the load unit is in the form of a light, it is not intended to be limited to the details shown, since various modifications and structural changes may be made without departing in any way from the spirit of the present invention. For example, the load unit can be in the form of a photoflash device, a blinker signal, a ventilator or fan, a shaving apparatus, a medicinal or treating apparatus, a lighted microscope, an electric timepiece, and many others.

Without further analysis, the foregoing will so fully reveal the gist of the present invention that others can by applying current knowledge readily adapt it for various applications without omitting features that, from the standpoint of prior art, fairly constitute essential characteristics of the generic of specific aspects of this invention and, therefore, such adaptations should and are intended to be comprehended within the meaning and range of equivalence of the following claims.

What is claimed as new and desired to be secured by Letters Patent is:

1. A portable combined power unit-load unit assembly, comprising, in combination, a load containing unit including receptacle means electrically connected with said load and adapted to receive contact prongs for applying a potential to said load, and a power unit adapted to be mechanically and electrically connected to said load unit and including a storage battery and prong means electrically connected with said battery for connecting said power unit to said load unit by insertion of said prong means into said receptacle means, and, alternatively, by insertion of said prong means into the outlet receptacle of a source of electricity to thereby charge said battery, said prong means and receptacle means being so constructed and arranged that when said units are connected to each other as aforesaid said prong means occupy a position entirely within said load unit.

2. A portable combined power unit-load unit assembly, comprising, in combination, a power unit formed with a surface portion and including a storage battery, rectifier means electrically connected to said storage battery, and prong means electrically connected to said rectifier means and projecting through said surface portion for connecting said power unit to said load unit, and, alternatively, to a source of alternating current in such a manner that said storage battery is charged thereby; said load unit formed with a surface portion corresponding to said surface portion of said power unit and being provided with receptacle means for receiving said prong means, said units being so constructed and arranged that when said surface portions thereof are superposed upon each other, said units are mechanically connected to each other by engagement of said receptacle means with said prong means, and the latter are completely covered by said load unit; and additional prong means carried by said load unit and adapted to be received within said power unit for electrically connecting said load unit directly across said storage battery when said surface portions of said units are superposed upon each other.

3. A portable combined power unit-load unit assembly, comprising, in combination, a power unit formed with a first surface portion and including a storage battery, rectifier means electrically connected to said storage battery, first prong means projecting through said first surface portion and electrically connected to said rectifier means for connecting said power unit to a source of alternating current in such a manner that said storage battery is charged thereby, and first socket means opening at said first surface portion and electrically connected directly across said storage battery; and a load unit formed with a second surface portion corresponding to said first surface portion of said power unit and including a load component, second prong means electrically connected to said load component, said second prong means projecting through said second surface portion and being adapted to be received in said first socket means of said power unit, and second socket means opening at said second surface portion and adapted to receive said first prong means of said power unit, said units being so constructed and arranged that when said surface portions thereof are superposed upon each other, said first prong means of said power unit are located entirely within said second socket means of said load unit, and mechanically connect said units to each other and said second prong means of said load unit are located entirely within said first socket means of said power unit thereby electrically connecting said load component directly across said storage battery.

4. A portable power unit-load assembly as defined in claim 3, and manually operable switch means in the electric circuit incorporating said load component and said storage battery for opening and closing said circuit whenever desired.

5. A connector for use with a power unit as defined in claim 3 for enabling said storage battery thereof to be connected to a source of direct current in such a manner as to be charged thereby, comprising, in combination, a body formed with a further surface portion corresponding to said first surface portion of said power unit; input terminal means on said body; further prong means electrically connected to said input terminal means, said further prong means projecting through said further surface portion and being adapted to be received in said first socket means of said power unit; and further socket means opening at said further surface portion and adapted to receive said first prong means of said power unit, said power unit and said body being so constructed and arranged that when said surface portions thereof are superposed upon each other, said first prong means of said power unit are received by said further socket means of said connector and mechanically connect said power unit and said connector to each other and said further prong means of said connector are received by said first socket means of said power unit thereby electrically connecting said storage battery of said power unit directly across said input terminal means of said connector.

6. In a portable two-unit electrical utility device, a load unit including an electrical utility element and receptable means, a power unit including a rechargeable battery, a rectifier, prong means, and circuit connection means electrically connecting said battery, rectifier and prong means to enable charging of said battery upon insertion of said prong means into an outlet receptacle of a source of alternating current, said prong means being insertable into said receptacle means to positively interconnect said units into a unitary structure, and alternatively, into said outlet receptacle to recharge said battery through said circuit connection means, and circuit means carried by said units and electrically connecting said element and battery when said units are interconnected, as aforesaid.

7. In a portable two-unit electrical utility device, a load unit including an electrical utility element, a receptable, and first circuit means connecting said element and receptable, a power unit including a rechargeable battery, a rectifier, prongs, and circuit connections between said battery, rectifier and prongs, said prongs being insertable into said receptable to separately connect said units into a unitary structure and, alternatively, directly into an outlet of a source of alternating current to thereby charge said battery through said rectifier and said circuit connections, and second circuit means carried by said units and connecting said battery directly with said receptable when said units are interconnected as aforesaid.

8. In a portable two-unit electrical flashlight, a load unit including an electric lamp and a receptacle, a power unit including a rechargeable battery, a rectifier, prong means, and circuit connections electrically connecting said battery, rectifier and prong means, said prong means being insertable into said receptable of said load unit to positively interconnect said units into a single unitary structure and, alternatively, into an outlet receptable for a source of alternating current, to recharge said battery through said rectifier and said circuit connections, when said units are separated, and circuit means carried by said units and directly electrically connecting said battery with said lamp when said units are interconnected by said prong means.

9. In a portable two-unit electrical utility device, a load unit including an electrical utility element and an electrical receptacle, a power unit including a rechargeable battery, a rectifier, prong means, circuit connections between said prong means, rectifier, and battery, said prong means being insertable into said receptacle to positively mechanically interconnect said units into a unitary structure, said prong means being alternatively insertable into an alternating current outlet receptacle to thereby recharge said battery through said rectifier, and electrical circuit means carried by said units and electrically connecting said battery directly with said utility element simultaneously with insertion of said prong means into said electrical receptacle to interconnect said units, as aforesaid.

10. A two-unit electrical utility device as in claim 9, said circuit means comprising a normally open switch carried by said power unit, and means projecting from said first unit and engaging said switch to close the same when said units are interconnected as aforesaid.

11. A two-unit electrical utility device as in claim 9, said circuit means comprising first and second pairs of contacts fixed with said load unit and said power unit, respectively, each said contact of one pair engaging a corresponding contact of the other pair when said units are interconnected, as aforesaid.

12. A two-unit electrical utility device as in claim 11, said first pair of contacts comprising projections extending from said load unit and said second pair of contacts comprising sockets carried by said power unit, each said projection entering a respective one of said sockets.

13. In a portable, two-unit flashlight, a load unit including an electric lamp socket, a contact receptable, and first circuit means electrically connecting the contacts in said receptacle with said lamp socket, a power unit including a rechargeable battery, a rectifier, prongs, and circuit connections electrically connecting said battery, rectifier and prongs, said prongs being insertable into said contact receptacle to detachably interconnect said units into a single unitary structure, and, alternatively upon disengagement of said units, into an outlet receptacle for a source of alternating current to thereby recharge said battery through said rectifier and circuit connections, second circuit means directly connecting said battery with said prongs, and including a normally open switch, and means carried with said load unit and closing said switch by and in response to interconnection of said units as aforesaid.

14. A portable two-unit electrical flashlight as in claim 13, said switch including a normally-open spring contact in said power unit and a base fixed with said load unit and engaging said switch to close said second circuit means when said units are interconnected by insertion of said prongs into said receptable of said load unit.

15. In a two-unit flashlight, a load unit comprising a first casing part, a power unit comprising a second casing part, said parts having respective first and second matching surfaces adopted to contact, said load unit including an electric lamp, sockets opening through said first surface, and first circuit means connecting said lamp and receptacle means, said power unit including a rechargeable battery, a rectifier, prongs projecting from said second surface, and electrical connections between said prongs, rectifier and battery, said prongs being completely insertable each into a respective one of said sockets, to positively interconnect said units into a unitary structure, and being also alternatively directly insertable into the outlet socket of a source of alternating current to recharge said battery, and second circuit means carried by said second casing part and connecting said battery directly with said first circuit means when said units are interconnected as aforesaid.

16. In a two-unit portable electric utility device, a load unit comprising a casing part having an electrical utility element and a receptacle, a power unit comprising a second casing part and having a rechargeable battery, a rectifier, first prong means, and circuit connections electrically connecting said battery, rectifier and first prong means, said first prong means being insertable into said receptacle of said load unit to frictionally and releasably interconnect said casing parts into a unitary complete enclosure and, alternatively, directly into an outlet receptacle of a source of alternating current, to recharge said battery through said rectifier and said circuit connections, when said power unit is separated from said load unit, and circuit means carried by said casing parts and effective to directly electrically connect said battery to said element when said parts are interconnected as aforesaid, said means comprising first and second pairs of contacts carried by said first and second casing parts, respectively, each said contact of one pair engaging a respective contact of the other pair when said casing parts are interconnected as aforesaid.

17. A device as in claim 16, said casing parts have first and second matching external surfaces, respectively, in face-to-face contact when said parts are interconnected, said receptable opening through said first surface, said prongs protruding from said second surface, said first pair of contacts being in said first surface and said second pair of contacts being in said second surface.

References Cited in the file of this patent
UNITED STATES PATENTS 2,628,339     Werner _____ Feb. 10, 1953

OTHER REFERENCES

APC publication of Zdansky, Ser. No. 427,480, published June 15, 1943 (abandoned).

Notice of Adverse Decision in Interference

In Interference No. 94,244 involving Patent No. 3,067,373, R. Hopt, L. Falk and A. Haring, POWER-UNIT LOAD UNIT ASSEMBLY, final judgment adverse to the patentees was rendered Sept. 14, 1965, as to claims 6 and 8.

[*Official Gazette December 14, 1965.*]